Patented Sept. 1, 1925.

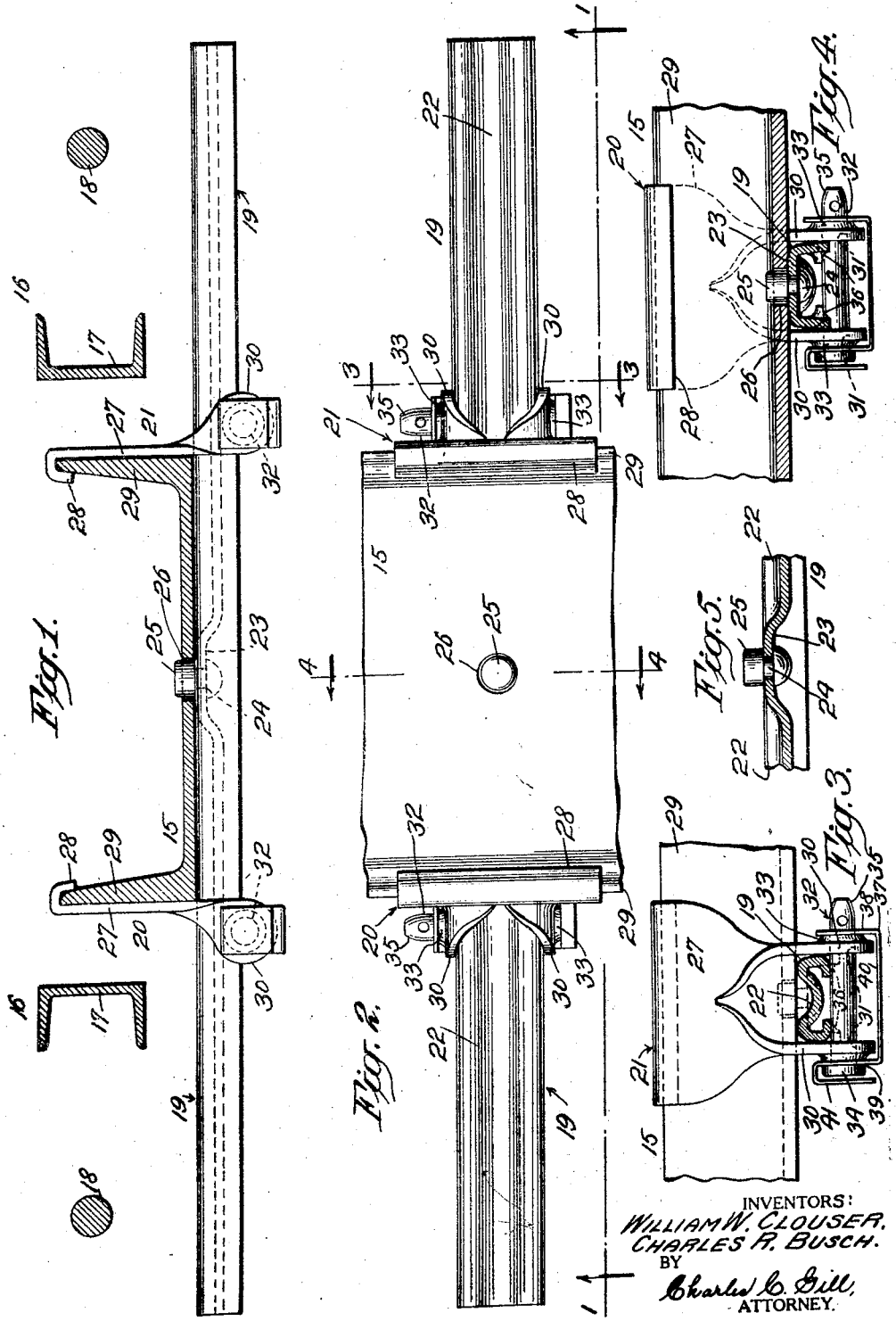

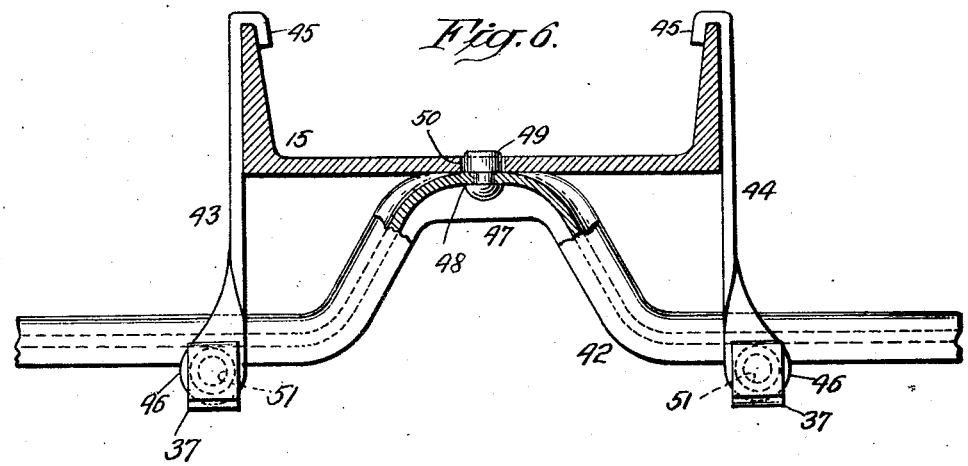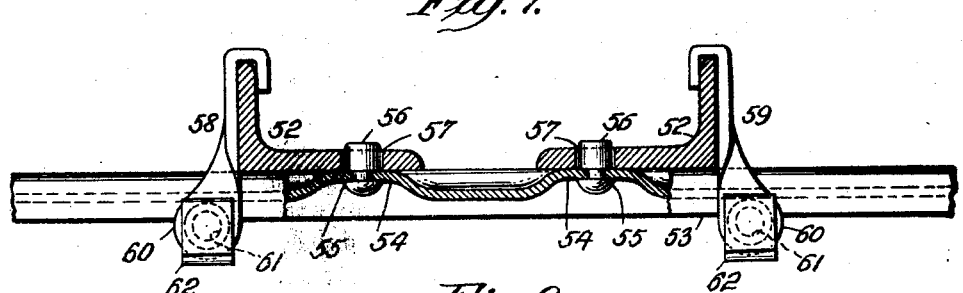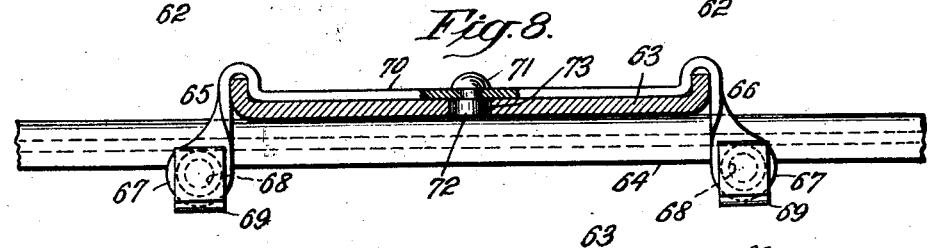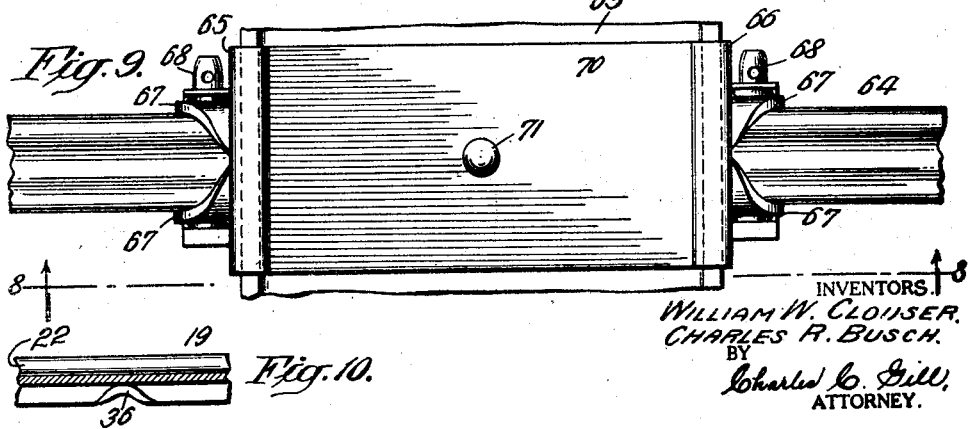

1,551,537

UNITED STATES PATENT OFFICE.

WILLIAM W. CLOUSER, OF HACKENSACK, AND CHARLES R. BUSCH, OF EAST ORANGE, NEW JERSEY, ASSIGNORS TO BUFFALO BRAKE BEAM COMPANY, OF NEW YORK, N. Y., A CORPORATION OF NEW YORK.

AUXILIARY OR EMERGENCY SAFETY SUPPORT FOR BRAKE BEAMS.

Application filed February 9, 1925. Serial No. 7,756.

*To all whom it may concern:*

Be it known that we, WILLIAM W. CLOUSER, a citizen of the United States, and a resident of Hackensack, in the county of Bergen and State of New Jersey, and CHARLES R. BUSCH, a citizen of the United States, and a resident of East Orange, in the county of Essex and State of New Jersey, have jointly invented certain new and useful Improvements in Auxiliary or Emergency Safety Supports for Brake Beams, of which the following is a specification.

The invention pertains to railway brake beams, and particularly to novel auxiliary or emergency supporting bars extending below and to receive the brake beams in the event that said beams should become detached from their hangings, one purpose of the invention being to prevent, in case of accident, the brake beams from falling under the wheels, derailment being thus avoided.

A further object of the invention resides in the means we have provided for securing the auxiliary or emergency supporting bars against the bottom of the spring plank, these means comprising hangers extending downwardly from the opposite sides of the spring plank and receiving between their lower bifurcated portions the said bars and, also, transverse pins extending through the bifurcated portions of said hangers below said bars and binding said bars upwardly against the bottom of the spring plank. The means we have provided for applying the auxiliary or emergency safety bars to the spring plank are of inexpensive nature and easily manipulated and are detachably applied to the spring plank, and the means we have provided for securing the safety bar between the lower split or bifurcated ends of the hangers and against the bottom of the spring plank, while efficiently securing the bars in position, permit of the convenient detachment of the same from the spring plank. Our invention also involves means for preventing endwise movement or transverse movement of the auxiliary or emergency supporting bars, these means also preventing, in connection with the auxiliary bars, any lateral creeping of the aforesaid hangers along the spring plank.

The invention will be fully understood from the detailed description hereinafter presented, reference being had to the accompanying drawings, in which:

Fig. 1 is a vertical longitudinal section, partly broken away, through a car truck equipped with the features of our invention, the section being on the dotted line 1—1 of Fig. 2;

Fig. 2 is a top view, partly broken away, of the same;

Fig. 3 is a vertical transverse section through the same, taken on the dotted line 3—3 of Fig. 2;

Fig. 4 is a vertical transverse section through the same, taken on the dotted line of 4—4 of Fig. 2;

Fig. 5 is a fragmentary vertical longitudinal section through the central portion of one of the auxiliary or safety bars;

Fig. 6 is a side elevation, partly broken away and partly in section, of a modified embodiment of our invention, Fig. 6 corresponding with Fig. 1, but illustrating the employment of longer hangers than those shown in Fig. 1 and an auxiliary safety bar having depressed portions for the accommodation of brake beams which may hang below the lower horizontal plane of the spring plank;

Fig. 7 is a like section through a further modified form of the invention, this section showing the application of the invention to a different type of spring plank;

Fig. 8 is a section on the line 8—8 of Fig. 9, of a further modified form of the invention, this modification consisting in having the hangers integral with a bridge-piece extending across the upper surface of the spring plank, which in this instance has edge flanges which are too shallow to safely take the hangers without said bridge-piece being present;

Fig. 9 is a top view of the construction shown in Fig. 8, and

Fig. 10 is a central longitudinal section through a fragmentary portion of the auxiliary or safety bar and is presented to illustrate the recesses which we form in said bar at the points where the bar is to be engaged by the transverse securing pins.

In the drawings, referring to Figs. 1 to 5 inclusive, 15 designates a conventional form of spring plank and 16 portions of inside-hung trussed brake beams of usual character, the beam-parts shown being the compression members 17 and truss rods or tension members 18.

With reference to Figs. 1 to 5 inclusive, we would say that the invention resides in the auxiliary or emergency safety bar 19 and the means for securing this bar in a detachable manner to the spring plank 15, said means comprising hangers 20, 21 of wrought metal extending downwardly from the upper edges of the side flanges of the spring plank 15, and said hangers being of special construction adapted to the securing of the bar 19.

There will be a bar 19 and hangers 20, 21 at each side of the car truck, and said bars extend longitudinally below the end portions of the brake beams and are adapted to receive said beams in the event of accident to the brake beam hangers or other parts whereby said beams should become detached and fall.

In the present instance the auxiliary bars 19 are of inverted channel shape and are formed with a longitudinal depression, as at 22, along the center of their upper wall, this form of bar possessing great strength without undue use of metal and without occupying undue space in the means by which the bars are supported. In the construction shown in Figs. 1 to 5 inclusive the bars are plain straight channel bars having the longitudinal depression 22 and at the center thereof being pressed upwardly, as at 23, to form a flat section for a rivet 24, this rivet 24 being carried by the bar 19 and having an enlarged upper end portion 25 which fits within a vertical aperture or opening 26 formed, by burning or otherwise, in the transverse central portion of the spring plank 15. The rivet 24 is detachable from the spring plank, but when in the position shown in Figs. 1 and 2, said rivet serves to center or key the bar 19 against endwise movement and also against lateral movement.

The hangers 20, 21 are alike, except that they are reversed when in position on the spring plank, and said hangers each comprises a broad vertical body-portion 27 which is of hook formation along its upper edge, as at 28, to be hooked upon the upper edge of the side flange 29 of the spring plank, the body of the hanger lying against the outer vertical side of said flange and extending downwardly below the spring plank. The hangers 20, 21 are each formed of sheet metal initially of rectangular outline, and this blank of metal is formed at one edge with the hook 28 and at its other end is split or bifurcated, and the portions at opposite sides of the split or bifurcation are twisted outwardly in reverse directions to form the corresponding ears 30 at the lower end of each hanger, the space between the ears 30 of each hanger being such as to snugly receive the width of the bar 19, as shown in Figs. 3 and 4.

The ears 30 are, of course, integral with the body portion 27 of the hangers 20, 21, as shown in Figs. 3 and 4, and said ears are formed with corresponding transverse openings 31 to receive locking pins 32 by means of which the bars 19 are firmly secured in position against the bottom of the spring plank, as will be understood on reference to Figs. 3 and 4. The openings 31 in the ears 30 are reinforced by embossing the metal around said openings outwardly, as at 33, the embossments 33 serving not only to strengthen the ears 30 but also to afford longer bearing surfaces at openings 31 for the pins 32. Each hanger 20, 21 is in one integral piece of wrought metal, and hence is not only of simplified construction but of great strength and durability.

When it is desired to apply the auxiliary or emergency bar 19 to the spring plank, said bar may be given the position in which it is shown in Fig. 1 with the upper enlarged end of the rivet 24 applied within the opening or hole 26 in the spring plank, and thereupon the hangers 20, 21 may be hung upon the spring plank with their ears 30 straddling the bar 19, after which the pins 32 may be driven through the openings 31 in the ears 30 for securing said bar 19 in firm engagement with the bottom of the spring plank, the application of said pins 32 to position also serving to act downwardly against the hangers 20, 21 and increasing the gripping action of the hooks 28 against the flanges of the spring plank. The pins 32 are tapered at one end and have a head 34 at the other end, and said pins are in the nature of wedge pins and are driven through the openings 31 in the ears 30 with wedging or binding effect against the flanges of the bar 19, the forward end of said pins being tapered, as at 35, to enable them to enter the apertures 31 in the far ears 30 and to impinge strongly against the flanges of the bar 19. The binding action of the pins 32 against the flanges of the bar 19 may be emphasized when the pins 32 have the tapered forward ends enabling them to find their path through the apertures in the far ears 30. The lower edges of the bar 19 are preferably recessed inwardly, as at 36 (Figs. 3, 4 and 10), to form transverse concave seats for the pins 32, these seats serving as recesses and interlocking with the pins 32 and, while affording substantial bearings for the pins 32, also preventing the bars 19 from having endwise movement. The recesses 36 are formed by pressing the lower edges of the sides of the bar 19 inwardly toward each other at the points where said sides are to be engaged by the pins 32, as will be readily understood on reference to Figs. 3, 4 and 10.

After the bar 19 and hangers 20, 21 have been applied to the spring plank and said bar has been secured by the pins 32, the structure of our invention is one of great rigidity and strength and is immovably held in place, the pins 32, 32 preventing endwise movement of the bar 19 and the rivet 24 preventing lateral movement in the bar 19 and hangers 20, 21, said hangers being thus prevented from creeping along the flanges of the spring plank.

The bar 19 may, however, be readily removed from the hangers 20, 21 and from the spring plank at any time it may seem to be desirable to detach the same, and in carrying out this feature of the operation it will be obvious that on the removal of the pins 32 the bar 19 may be dropped directly downwardly from the hangers 20, 21. The hangers 20, 21 may at that time also be removed from the spring plank, if it should be so desired, by merely lifting the hangers from the flanges 29 of the spring plank.

The pins 32 are formed at their forward ends with holes to receive cotter keys, as shown in Figs. 3 and 4, and we preferably apply to each pin 32 a pin-lock 37 which will prevent the loss of the pin in the absence of the cotter key whether by reason of said key not having been supplied to the pin or having become broken or otherwise destroyed. The pin lock 37 is formed of sheet metal and has one member 38 against the outer side of one ear 30, a corresponding member 39 against the outer face of the opposite ear 30, a member 40 connecting said members 38, 39 and an extension member 41 bent over from the member 39 against the head 34 of the pin 32, said members 38, 39 being apertured to permit the pin 32 to pass through them. We do not limit our invention to the employment of the pin lock 37, but we are aware that it is of advantage to apply said pin lock to each of the pins 32.

In Fig. 6 we illustrate a construction of the auxiliary or emergency supporting bar and hangers adapted to car truck structures in which the brake beams hanging lower than shown in Fig. 1, extend below the lower horizontal plane of the spring plank. In Fig. 6 we number the spring plank 15, since it is the same as the spring plank shown in Fig. 1, and we number the auxiliary or emergency supporting bar 42 and the hangers 43, 44, respectively. These hangers are formed on their upper ends with hooks 45 to engage the upper edges of the side flanges of the spring plank 15 and thence extend downwardly a considerable distance below the bottom of the spring plank and are formed with ears 46 corresponding with the ears 30 shown in Figs. 1 to 4 inclusive. The hangers 43, 44 do not require special detailed description, because they differ from the hangers 20, 21 of Fig. 1 in being of greater vertical length than said hangers 20, 21. The auxiliary bar 42 is bent upwardly at its middle portion, as at 47, so as to engage the bottom of the spring plank 15 and at the apex of its upwardly bent portion said bar 42 is provided with a rivet 48 corresponding with the rivet 24 shown in Fig. 1, said rivet 48 having an enlarged upper end portion 49 which freely fits within a vertical hole 50 formed in the spring plank. The bar 42 extends longitudinally of the truck, one end portion being below one of the brake beams and the other end portion being below the other brake beam. The bar 42 corresponds exactly with the bar 19 of Fig. 1 with the exception that to meet the situation created by the lower-hung brake beams, the end portions of said bar 42, by bending the bar itself, are positioned on a low horizontal plane to extend below and normally free of the brake beams. In Fig. 6 the end portions of the bar are secured between the pairs of ears 46 by means of wedge-pins 51 corresponding exactly with the pins 32 of Fig. 3, and preferably we apply upon the pins 51, pin-locks 37 of the kind shown in Fig. 3.

In Fig. 7 is shown a different type of spring plank having angle-iron bars 52 at its front and back edges. In Fig. 7 the auxiliary bar is numbered 53 and corresponds with the bar 19 of Fig. 1 with the exception that said bar 53 in its top portion is flattened upwardly at two points, as at 54, to engage the lower flat surfaces of the angle iron bars 52, said flat table portions 54 being equipped with rivets 55 having enlarged upper ends 56 to snugly though freely enter holes 57 provided in the horizontal flanges of the bars 52 to receive them. The rivets 55 correspond exactly with the rivet 24 shown in Fig. 1, but owing to the type of the spring plank shown in Fig. 7 it is necessary to employ two of the rivets 55, one to engage each angle bar 52. The hangers 58, 59 shown in Fig. 7 correspond with the hangers 20, 21 shown in Fig. 1, said hangers 58, 59 having the laterally turned ears 60 to receive the auxiliary bar 53, which is held in place by wedge pins 61 of the kind shown in Fig. 3. Preferably the pins 61 will each be equipped with a pin-lock 62 corresponding with the pin-lock 37 shown in Figs. 3 and 4.

In Figs. 8 and 9 we illustrate our invention as applied to a very shallow well-known form of spring plank 63, and in Figs. 8 and 9, 64 denotes the auxiliary emergency supporting bar and 65, 66 denote the hangers formed of plate metal suspended from the opposite flanges of said spring plank and having the ears 67 corresponding with the ears 30 of Fig. 1 between which the bar 64 is supported on pins 68 corresponding exactly with the pins 32 of Fig. 3. The pins 68 will also preferably be equipped with pin-locks 69 of the kind shown in Fig. 3. The hangers 65, 66 are in themselves substantially duplicates of the hangers shown in Figs. 1 to 4 inclusive, but in this instance owing to the shallow nature of the spring plank 63, we connect the hangers 65, 66 by an integral bridge-piece 70 which lies upon the upper surface of the bottom of the spring plank and carries a rivet 71 whose enlarged lower end 72 snugly fits within a hole 73 formed in the spring plank 63. The bridge-piece 70 and hangers 65, 66 are all formed out of one integral plate of metal, as will be fully understood on reference to Fig. 9. The rivet 71 correctly positions the hangers on the spring plank and there holds them.

In all the forms of our invention we provide an efficient auxiliary or emergency supporting bar extending longitudinally below and free of the brake beams, and in all of the forms of our invention we provide special wrought metal broad plate hangers detachably applied upon the spring plank and having at their lower ends ears between which the auxiliary supporting bar is received and which are correspondingly transversely apertured to receive locking pins 32 which engage the bar and firmly bind the same against the bottom of the spring plank, and in each form of our invention, except that shown in Figs. 8 and 9, the auxiliary bar is provided with a rivet, stud or the like to engage an opening in the spring plank, whereby the bar is correctly positioned and centered and prevented from endwise or lateral movements and the hangers are held against lateral movement on the spring plank. In the form of the invention shown in Figs. 8 and 9 the aforesaid rivet, stud or the like is carried by the bridge-piece 70 and engages the spring-plank and serves to correctly position the hangers and hold them, and through them the bar 64, against lateral movement on the spring plank.

Our invention admits of modification to meet the requirements of the various spring plank structures, as the drawings indicate, and we desire to cover all modifications as may be within the spirit of the invention and the scope of the appended claims.

What we claim as our invention and desire to secure by Letters Patent, is:

1. A car-truck having a spring plank and inside hung brake-beams, an auxiliary or emergency safety bar extending longitudinally below and normally free of said beams, and means removably securing said bar to the spring-plank, comprising hangers suspended from the side flanges of the spring plank and extending below the same and formed with apertured longitudinally extending ears, said ears being adapted to receive between them said bar, and removable transverse pins extending through said apertures and firmly securing said bar in position.

2. In a car-truck having a spring plank and inside hung brake beams, an auxiliary or emergency safety bar extending longitudinally below and normally free of said beams, and means removably securing said bar to the spring plank, comprising hangers suspended from the side flanges of the spring plank and extending below the same and formed with apertured longitudinally extending ears, each of said hangers being in one integral piece of plate metal whose lower portion is split or bifurcated and has its two members turned laterally in reverse directions to form said ears, said ears being spaced apart to receive between them said bar, and removable transverse pins extending through the apertures of said ears and firmly securing said bar in position.

3. In a car-truck having a spring plank and inside hung brake beams, an auxiliary or emergency safety bar extending longitudinally below and normally free of said beams, and means removably securing said bar to the spring plank, comprising hangers suspended from the side flanges of the spring plank and extending below the same and formed with apertured longitudinally extending ears, each of said hangers being in one integral piece of plate metal whose upper edge is of hook-formation to engage the side flanges of the spring-plank and whose lower portion is split and has its two members turned laterally in reverse directions to form said ears, said ears being spaced apart to receive between them said bar, and removable transverse pins extending through the apertures of said ears and firmly securing said bar in position.

4. A car-truck having a spring plank and inside-hung brake-beams, an auxiliary or emergency safety bar extending longitudinally below and normally free of said beams, and means removably securing said bar to the spring plank, comprising hangers suspended from the side flanges of the spring plank and extending below the same and formed with apertured longitudinally extending ears, said ears being adapted to receive between them said bar, and removable transverse pins driven through said apertures and engaging the lower edge of said bar and binding said bar against the bottom of the spring plank and exerting a downward pull on said hangers.

5. A car-truck having a spring plank and inside hung brake-beams, an auxiliary or emergency safety bar extending longitudinally below and normally free of said beams, and means removably securing said bar to the spring plank, comprising hangers suspended from the side flanges of the spring plank and extending below the same and formed with apertured longitudinally extending ears, said ears being adapted to receive between them said bar, and removable transverse pins driven through said apertures and engaging the lower edge of said bar and binding said bar against the bottom of the spring plank and exerting a downward pull on said hangers, said hangers being removably hooked upon the opposite flanges of the spring plank and said bar having a pin or stud entering an aperture in the spring plank to center the structure on the plank and avoid shifting movement thereof.

6. A car-truck having a spring plank and inside-hung brake-beams, an auxiliary or emergency safety bar extending longitudinally below and normally free of said beams, and means removably securing said bar to the spring plank, comprising hangers suspended from the side flanges of the spring plank and extending below the same and formed with apertured longitudinally extending ears, said ears being adapted to receive between them said bar, and removable transverse pins driven through said apertures and engaging the lower edge of said bar and binding said bar against the bottom of the spring plank and exerting a downward pull on said hangers, said bar being of inverted channel cross-section and having opposite portions of its side flanges recessed inwardly to form seats for said pins.

7. A car-truck having a spring plank and inside-hung brake-beams, an auxiliary or emergency safety bar extending longitudinally below and normally free of said beams, and means removably securing said bar to the spring plank, comprising hangers suspended from the side flanges of the spring plank and extending below the same and formed with apertured longitudinally extending ears, said ears being adapted to receive between them said bar, and removable transverse pins driven through said apertures and engaging the lower edge of said bar and binding said bar against the bottom of the spring plank and exerting a downward pull on said hangers, said bar being of inverted channel form and engaged at its lower edges by said pins and carrying a rivet or stud which freely enters an aperture in the spring plank to center the structure and avoid shifting movement thereof on the plank.

8. In a car-truck having a spring plank and inside-hung brake beams, an auxiliary or emergency safety bar extending longitudinally below and normally free of said beams, hangers removably suspended from said spring plank and each being an integral plate of metal having its lower end split and with the split ends turned outwardly in reverse directions to form ears receiving between them said auxiliary bar, transverse pins extending through said ears and engaging and supporting said bar and binding the same against the bottom of the spring plank, and means freely engaging the spring plank for preventing said hangers and bar from having shifting movement on the spring plank.

9. In a car-truck having a spring-plank and inside-hung brake beams, an auxiliary or emergency safety bar extending longitudinally below and normally free of said beams, hangers freely suspended from the flanges at opposite sides of the spring plank and having spaced-apart ears at their lower ends receiving between them the said auxiliary bar, pins extending through said ears and engaging the lower edge of said bar and binding the same against the spring plank and at the same time acting to draw downwardly on said hangers into more firm engagement with the spring plank, and a stud connected with one member of the structure and freely entering a hole in the spring plank for preventing shifting movement of the hangers and bar along the spring plank.

10. In a car-truck having a spring plank and inside hung brake beams, an auxiliary or emergency safety bar extending longitudinally below and normally free of said beams and means removably supporting and securing said bar, comprising plate metal hangers removably suspended from the opposite sides of the spring plank and having transversely apertured ears at their lower ends, said ears being spaced apart to receive said bar between them, and transverse pins extending through said ears and engaging said bar and securing the same in position.

Signed at New York city, in the county and State of New York, this 7th day of February, 1925.

WILLIAM W. CLOUSER.
CHARLES R. BUSCH.